June 29, 1926.
F. E. GARBUTT ET AL
1,590,361
SHUTTER CONTROL DEVICE FOR MOTION PICTURE MACHINES
Filed March 10, 1923   3 Sheets-Sheet 1
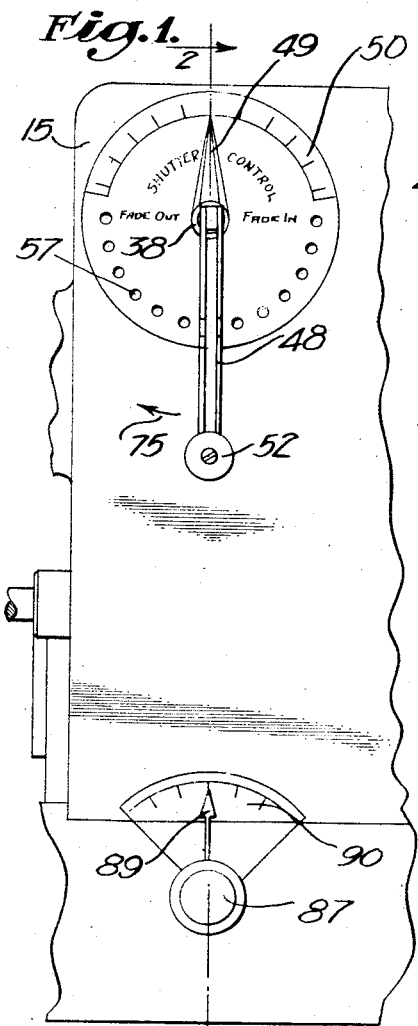
Fig. 1.
Fig. 5.
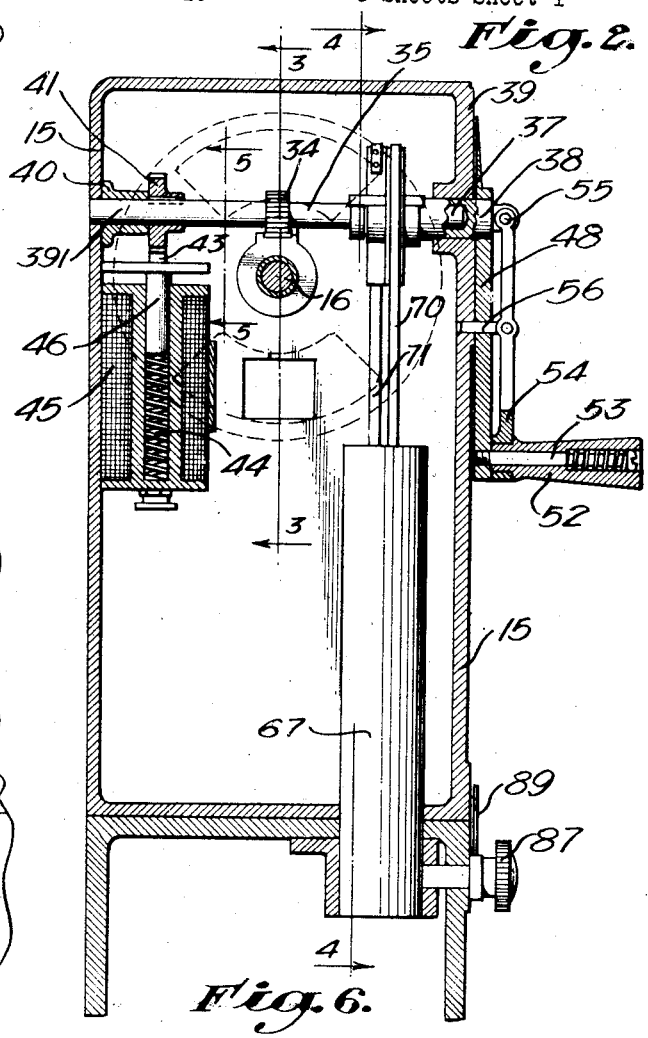
Fig. 2.
Fig. 6.
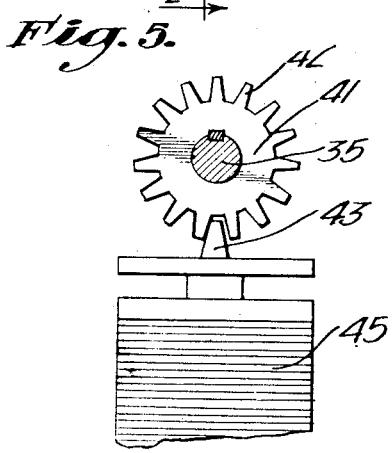
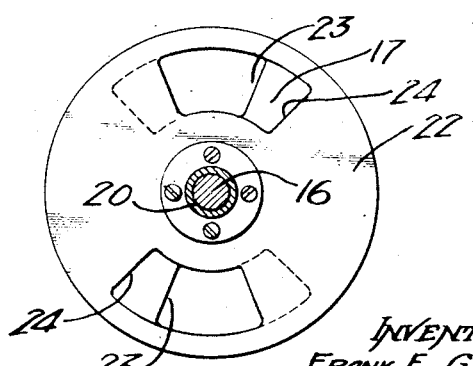
INVENTOR:
FRANK E. GARBUTT,
RALPH G. FEAR,
BY
Graham + Harris
ATTORNEYS

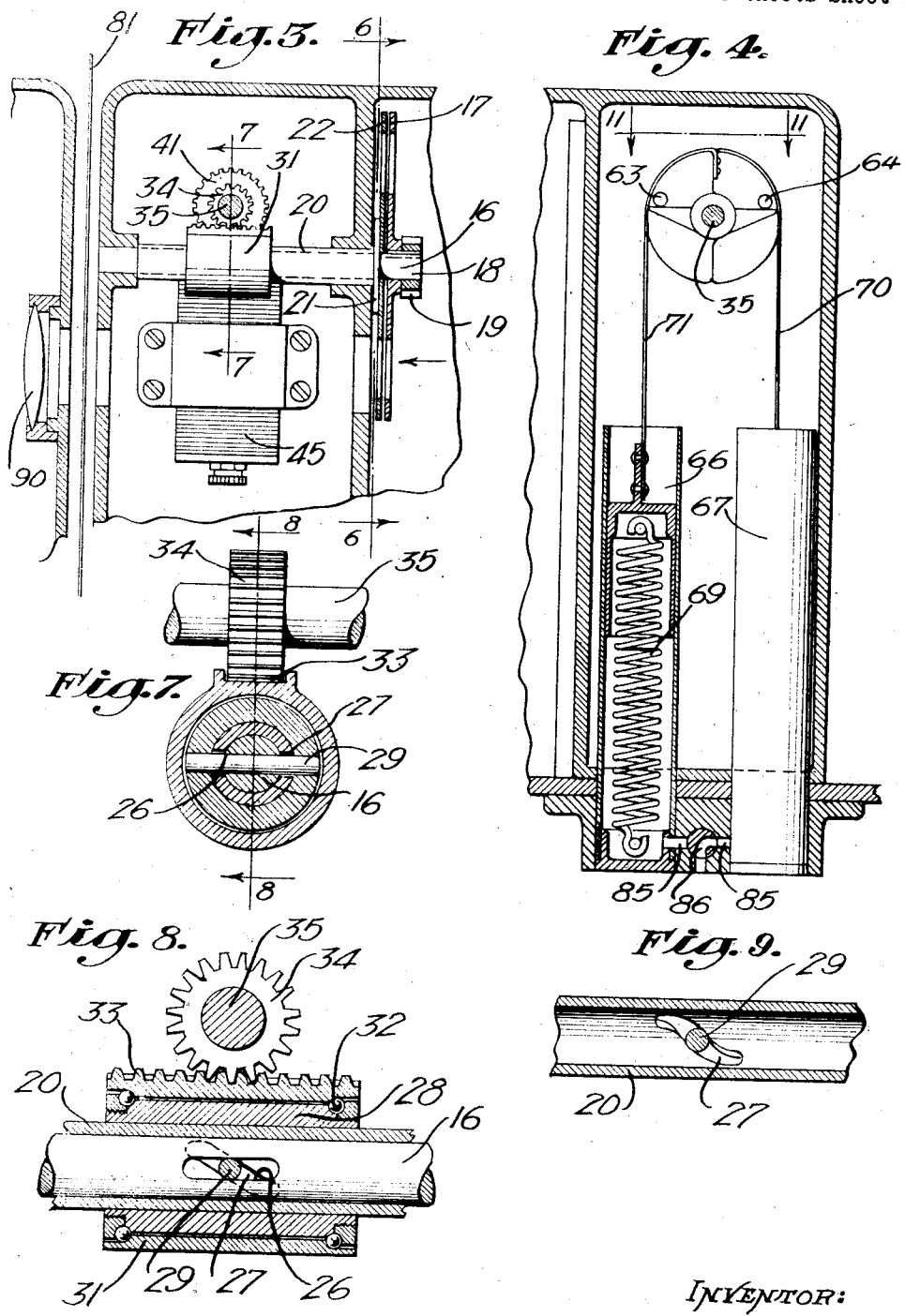

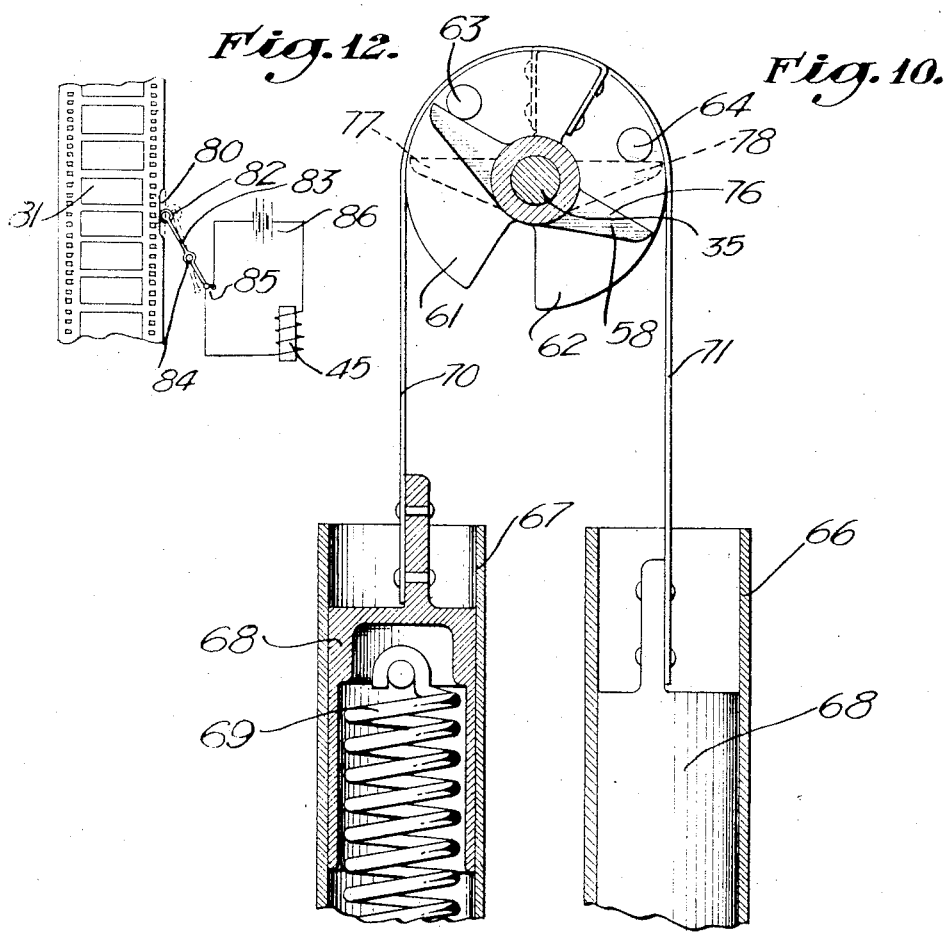
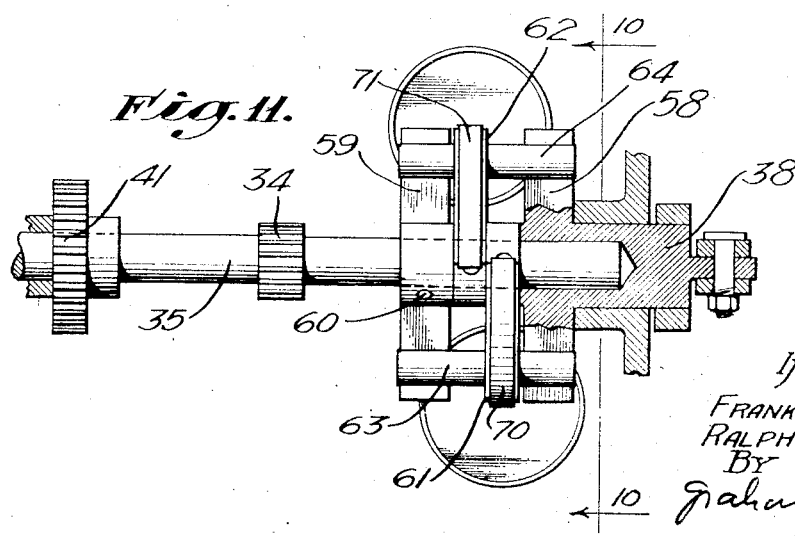

Patented June 29, 1926.

1,590,361

UNITED STATES PATENT OFFICE.

FRANK E. GARBUTT AND RALPH G. FEAR, OF LOS ANGELES, CALIFORNIA, ASSIGNORS TO FAMOUS PLAYERS-LASKY CORPORATION, A CORPORATION OF NEW YORK.

SHUTTER-CONTROL DEVICE FOR MOTION-PICTURE MACHINES.

Application filed March 10, 1923. Serial No. 624,282.

This invention relates to motion picture apparatus and particularly to shutters which are employed in motion picture machines for controlling the intermittent passage of light rays, and the invention consists principally of means for varying the size of the shutter openings so as to reduce or increase the length of time during which the light is allowed to pass at each operation of the shutter.

The invention may be employed with various motion picture machines but has particular utility in projection printing machines and will hereinafter be described in application to a projection printer.

It often occurs that negatives taken of different scenes which go to make up a complete motion picture production will be under-exposed or over-exposed, owing to varying light conditions and to the improper setting of camera stops by the operator. In the printing of positives from these under and over-exposed negatives, it is necessary to vary the printing light in order to get a properly exposed product. The extent of the chemical reaction of light rays upon sensitized film surfaces depends upon two conditions: first, the strength of the light and, secondly, the length of time which the sensitized surface is exposed to light. Therefore, in the printing of the positive it is possible to compensate for the under or overexposure of the negative, by varying either the strength of the printing light or the length of exposure of the positive film to a designated strength of printing light.

It is an object of our invention to provide a means whereby the light openings in the shutter may be varied to increase or decrease the length of time during which light rays will be allowed to pass therethrough, thus making it possible to vary the length of exposure of the positive film to light rays so as to compensate for conditions of over exposure and under exposure in the negative.

It is a further object of the invention to provide a device of this character by which fade-outs and fade-ins may be accomplished by varying the size of the shutter openings.

It is a further object of the invention to provide a mechanism which may be set, previous to the arrival of an improperly exposed portion of film before the projection lens, so that the shutter will operate to change the length of exposure of that portion of the film when it arrives before the projection lens.

The principal advantages of our invention and further objects thereof will be made evident hereinafter.

Referring to the drawings which are for illustrative purposes only,

Fig. 1 is an external elevational view of a portion of a projection printer casing in which the light shutters and shutter control mechanism is situated.

Fig. 2 is a vertical section taken upon a plane represented by the line 2—2 of Fig. 1.

Fig. 3 is a fragmentary section taken upon a plane represented by the line 3—3 of Fig. 2.

Fig. 4 is a vertical section taken upon a plane represented by the line 4—4 of Fig. 2.

Fig. 5 is a fragmentary section taken upon a plane represented by the line 5—5 of Fig. 2, for the purpose of showing the manner in which the latch member engages a toothed wheel mounted upon the control shaft of the device.

Fig. 6 is a face view of the improved shutter, taken as indicated by the line 6—6 of Fig. 3.

Fig. 7 is a fragmentary section taken upon a plane represented by the line 7—7 of Fig. 3.

Fig. 8 is a section taken upon a plane represented by the line 8—8 of Fig. 7.

Fig. 9 is a fragmentary section of the control plate sleeve, showing the helical groove formed therein.

Fig. 10 is an enlarged view illustrating the operation of the adjustment bar so that the desired movement of the follower bar will be accomplished upon the release of the control shaft, when that portion of the film arrives before the projection lens system.

Fig. 11 is an enlarged fragmentary plan view showing the control shaft and the adjuster and follower members mounted thereupon, this plan view being taken as indicated by the line 11—11 of Fig. 4.

Fig. 12 is a diagrammatic view illustrating a notched film and a follower adapted to engage the notch therein and to close an electric circuit with a solenoid which retracts the latched member from engagement with the tooth wheel mounted upon the control shaft.

As shown in the drawing, a casing 15 is provided, having a shutter shaft 16 mounted therein, to which shaft a circular shutter disk 17 is mounted at the forward end 18 thereof, adjacent to a driving gear 19. Upon the shutter shaft 16 a sleeve 20 is turnably mounted and is provided at its forward end with a flange 21, to which a control plate 22 is secured. As shown in Fig. 6 the shutter plate 17 and the control plate 22 have segmental openings 23 and 24 respectively therein which may extend through an angle of 90° as shown, but which may be made larger or smaller, as desired.

By rotating the control plate 22 upon the shaft 16 it is possible to decrease the size of the opening through which the light may pass, from a maximum or 90° breadth to complete closure. Under ordinary working conditions the light opening provided by the relative positions of the plates 17 and 22 is substantially 45°, thus making it possible to increase or decrease the size of light opening to correspond to the length of exposure required by the particular film being printed.

The relative rotation of the plate 22 and the sleeve 20, to which it is attached, upon the shaft 16, is accomplished by the mechanism shown in detail in Figs. 7, 8, and 9. The shaft 16 is provided with a longitudinal slot 26 and the sleeve 20 is provided with oppositely disposed helical slots 27, which are shaped to advance through an angle of 90°. Upon the sleeve 20 a sleeve 28 is mounted to slide longitudinally. A pin 29, having the ends thereof retained in sleeve 28, passes diametrally through the helical slots 27 in the sleeve 20 and the longitudinal slot 26 in the shaft 16. By moving the sleeve 28 axially upon the sleeve 20, the pin 29 may be caused to advance in either direction in the slots 26 and 27. The slots 27, being disposed helically with relation to the longitudinal slot 26, will cause the sleeve 20 to rotate upon the shaft 16 through an angle depending upon the advance of the sleeve 28. The advance of the helical slots 27 shown is through an angular space of substantially 90°, sufficient to cause the closing of the opening 23 in the shutter plate by the control plate 22. In the position of the pin shown in Figs. 8 and 9, the control plate 22 is advanced through an angle of 45° which constitutes the intermediate position shown in Fig. 6.

The position of the pin 29 in the slots 26 and 27 is controlled by the position of the sleeve 28 upon the control sleeve 20. This is accomplished by means of an outer sleeve 31 which is rotatably mounted on the sleeve 28 by means of ball bearings 32, and has a rack 33 formed thereupon which is engaged by a pinion 34 mounted upon a control shaft 35 extended across the casing 15 in a position above the shaft 16, and in a plane at right angles thereto.

From the foregoing explanation it will be perceived that the sleeve 28 may be moved axially upon the control sleeve 20 through the engagement of the pinion 34 with the rack 33, by rotating the shaft 35 in the desired direction. As shown in Fig. 2 the control shaft 35 has the forward end 37 thereof situated in a cup member 38 which extends through the front wall 39 of the case 15. The rearward end 391 of control shaft 35 is journaled in a bearing 40, and secured to said control shaft is a wheel 41 which is provided with teeth 42, adapted to be engaged by a latch member 43 which is normally held in such engagement by a spring 44, but which may be retracted from engagement with said wheel, by a solenoid 45 which attracts the core 46 of the latch member 43. The cup member 38 has a lever 48 secured thereto which provides a pointer 49 adapted to indicate the position of the lever upon a graduated scale 50. The lever 48 is provided with a handle 52 which may be drawn outwardly upon a pin 53, and which has the inner end thereof attached to a lever 54, said lever 54 being pivoted to the cup member 38 at 55 and provided with a latch pin 56 which engages holes 57 formed in the dial 50, thus providing means whereby the lever may be retained in a position corresponding to any of the graduations upon the scale 50.

As shown in the enlarged detail, Fig. 11, and in Figs. 2 and 4, the cup member 38 has an adjuster member formed upon the inner end thereof, consisting of laterally extending arms 58 spaced a short distance away from a follower member. The follower member 59 is secured upon the control shaft by means of a pin 60. Between the adjuster member and the follower member, plates 61 and 62 are mounted loosely upon the shaft, which plates are of circular formation as shown, and each have respectively a pin 63 and 64 mounted therein which extends across both the adjuster member and the follower member as shown.

Below the plates 61 and 62 a pair of dash pots 66 and 67 are located, having plungers 68 therein which are normally pulled down within the dash pots by means of tension springs 69. The plungers are respectively attached to the plates 61 and 62 by straps 70 and 71. These straps 70 and 71 exert a rotative pull upon the plate members, which holds the pins 63 and 64 down upon the arms of the adjuster and follower members. When the lever 48 is in the vertical position shown in Fig. 1, the arms 58 of the adjuster member are horizontally extended. Also when the shaft 35 is in a position to provide a centralizing of the sleeve 28 with respect to the slots 26 and 27, the follower member 59 is horizontally disposed. When these members are both horizontally disposed, the ends of the pins 63 and 64 are supported thereupon and are in the position in which they are shown in Figs. 2 and 4.

The shaft 35 is held against rotation by the engagement of the latched member 43 with the wheel 41, thus making it possible to move the adjuster member without a corresponding movement of the follower member. This makes it possible to set the device before the arrival of a portion of film which requires a different length of exposure. The action of the parts in accomplishing the setting of the machine may be traced by reference to the enlarged detail of Fig. 10. Let it be considered that the lever 48 is thrown to the left, as indicated by the arrow 75 in Fig. 1, to an extent providing the rotation of the follower member 59 to the position shown at 76 in Fig. 10. By so rotating the adjuster member the pin 63 located in the plate 61 will be lifted, against the action of the spring 69 in the dash pot 67, away from the end 77 of the follower member. The opposite end of the adjuster member will be lowered away from the pin 64, located in the plate 62 owing to the fact that the pin 64 is prevented from dropping with the adjuster member because the follower member is mounted upon the shaft which is rigidly held by the engagement of the latch 43 with the teeth 42 of the wheel 41. The entire tension of the spring 69 acting upon the plunger within the dash pot 66 is received through the pin 64 upon the end 78 of the adjuster member and would cause the rotation of the adjuster member, were it not for the engagement between the latch 43 and the wheel 41. Thus the machine is set so that the control shaft 35 will partially rotate upon the release of the wheel 41 which is accomplished in the following manner.

In the arranging of the negatives for printing, those sections which require a different printing light, due to their over or under exposure, are noted; and at the beginning of a portion which requires a different exposure to light, a notch 80 is formed in the edge of a negative film 81. A small roller 82, mounted upon an arm 83, which is pivoted at 84, rolls along the edge of the film and upon the arrival of the improperly exposed portion of the film, drops into the notch 80 and thus causes the closing of a switch 85 which is in circuit with an electro-generative source 86 and the solenoid 45. When the switch 85 is closed, which closure occurs coincident with the arrival of the improperly exposed portion of the negative 81 before the objective lens system 90 shown in Fig. 3, the solenoid 45 attracts the core 46 of the latch member 43 causing the latch 43 to be withdrawn from engagement with the wheel 41 and allowing the shaft 35 to rotate under the action of the spring situated in the dash pot 66, with the result that the pin 29 is moved within the slots 26 and 27, the control plate 22 moved relatively to the shutter plate 17, and the angular extension or length of the light opening varied.

Each of the dash pots 66 and 67 communicates through an opening 85 with a valve 86, operated by a member 87 located upon the exterior of the casing 15. By closing down the valve, it is possible to regulate the speed at which a plunger may be pulled down within one of the dash pots by the spring 69 associated therewith, this regulation of speed being accomplished by regulating the rate at which air or other fluid substance trapped below the plunger may escape from the dash pot. By this means it is possible to extend the opening or the closing of the shutter opening over any desired length of time by closing the valve 86 to the desired extent indicated by the pointer 89 upon the fade control 90. It will be perceived that by this means it is possible to accomplish a fade-out of a picture by previously setting the machine so that the shutters will close upon the arrival of that portion of the film at which the fade-out is desired to be made. The device may also be employed in a similar manner for fade-ins such as are customary in motion picture work.

We claim as our invention:

1. In a device of the class described, the combination of: a shutter; a control plate associated with said shutter; means for rotating said shutter and said control plate synchronously; means for incurring such a relative movement between said shutter and said control plate that the effective light aperture of said shutter and said control plate may be varied; and stop means for automatically limiting the movement between said shutter and said control plate.

2. In a device of the class described, the combination of: a shutter; a shaft for supporting said shutter, having a groove therein; a sleeve mounted on said shaft having grooves therein; a control plate mounted upon said sleeve; means for turning said sleeve upon said shaft while said shaft is in rotation, comprising a member slidably disposed on said shaft, and an engager adapted to be in said groove, in said shaft and said sleeve, said engager being supported by said slidably disposed member; means for axially moving said member upon said sleeve while said sleeve and said shaft are rotating; and stop means for automatically limiting the movement between said shutter and said control plate.

3. In a device of the class described, the combination of: a shutter; a shaft for supporting said shutter, having a groove therein; a sleeve mounted on said shaft, having grooves therein; a control plate mounted upon said sleeve; means for turning said sleeve on said shaft while said shaft is in rotation, comprising a member slidably disposed on said shaft, and an engager adapted to be in said grooves, in said shaft and said sleeve, said engager being supported by said slidably disposed member; means for axially moving said member upon said sleeve while said sleeve and said shaft are rotating, said means for axially moving said member upon said sleeve comprising a non-rotating member, in engagement with said slidable member, having a toothed rack formed thereon; a gear engaging said rack; a shaft upon which said gear is mounted; a latch means for holding said shaft against rotation; means for exerting a limited rotating force upon said shaft; and automatic means for releasing said latch means.

4. In a device of the class described, the combination of: a shutter; a control plate associated with said shutter; a first means for rotating said shutter and said control plate synchronously; a second means for producing such a relative movement between said shutter and said control plate that the effective light aperture of said shutter and said control plate may be varied; means for causing said second means to function at a designated time during the rotation of said shutter and said control plate; and stop means for automatically limiting the movement between said shutter and said control plate.

5. A device, as in claim 3, in combination with means for limiting the speed at which said shaft will rotate under the action of said rotative force.

6. In a device of the class described, the combination of: a shutter; a shaft for supporting said shutter, having a groove therein; a sleeve mounted on said shaft, having grooves therein; a control plate mounted upon said sleeve; means for turning said sleeve upon said shaft while said shaft is in rotation, comprising a member slidably disposed on said shaft, and an engager adapted to be in said grooves in said shaft and said sleeve, said engager being supported by said slidably disposed member; means for axially moving said member upon said sleeve while said sleeve and said shaft are in rotation, said means for axially moving said member upon said sleeve comprising a non-rotating member, in engagement with said slidable member, having a toothed rack formed thereupon; a gear engaging said rack; a shaft upon which said gear is mounted; a rotatable member adapted to be rotated into a designated position; and means operating between said rotatable member and said shaft, for rotating said shaft into a position corresponding to the position of said rotatable member.

7. In a device of the class described, the combination of: a shutter; a shaft for supporting said shutter, having a groove therein; a sleeve mounted on said shaft, having grooves therein; a control plate mounted upon said sleeve; means for turning said sleeve upon said shaft while said shaft is in rotation, comprising a member slidably disposed on said shaft, and an engager adapted to be in said grooves in said shaft and said sleeve, said engager being supported by said slidably disposed member; means for axially moving said member upon said sleeve while said sleeve and said shaft are in rotation, said means for axially moving said member upon said sleeve comprising a non-rotating member, in engagement with said slidable member, having a toothed rack formed thereupon; a gear engaging said rack; a shaft upon which said gear is mounted; a rotatable member mounted concentric with said shaft; an adjuster member upon said rotatable member; a follower member upon said shaft; a pair of plates turnably mounted between said adjuster member and said follower member; pins upon said plates adapted to rest against said adjuster and follower members; and means for exerting oppositely directed rotative forces upon said plates.

8. In a device of the class described, the combination of: a shutter; a control plate associated with said shutter; means for rotating said shutter and said control plate synchronously; mechanism for producing a relative movement between said control plate and said shutter; stop means for automatically limiting the movement between said shutter and said control plate; and means for setting said mechanism for subsequent actuation.

9. In a device of the class described, the combination of: a shutter; a control plate associated with said shutter; means for rotating said shutter and said control plate synchronously; mechanism for producing a relative movement between said control plate and said shutter; stop means for automatically limiting the movement between said shutter and said control plate; means for setting said mechanism for subsequent actuation; and means for actuating said mechanism.

10. In a device of the class described, the combination of: a shutter; a central plate associated with said shutter; means for rotating said shutter and said central plate synchronously; mechanism for producing a relative movement between said central plate and said shutter, said mechanism being capable of setting for subsequent actuation; means for locking said mechanism against actuation; and means for operating said means for locking said mechanism so as to permit the action of said mechanism.

In testimony whereof, we have hereunto set our hands at Los Angeles, California, this 3rd day of March, 1923.

FRANK E. GARBUTT.
RALPH G. FEAR.